(12) United States Patent
Rapoport et al.

(10) Patent No.: US 10,331,733 B2
(45) Date of Patent: *Jun. 25, 2019

(54) SYSTEM AND METHOD FOR PRESENTING CONDITION-SPECIFIC GEOGRAPHIC IMAGERY

(71) Applicant: Google LLC, Mountain View, CA (US)

(72) Inventors: Evan Rapoport, Los Altos, CA (US); Jeremy Bryant Pack, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,583

(22) Filed: Apr. 20, 2017

(65) Prior Publication Data
US 2018/0307707 A1    Oct. 25, 2018

Related U.S. Application Data

(63) Continuation of application No. 13/870,419, filed on Apr. 25, 2013, now Pat. No. 9,672,223.

(51) Int. Cl.
| | |
|---|---|
| *G06F 16/58* | (2019.01) |
| *G06F 16/51* | (2019.01) |
| *G06F 16/248* | (2019.01) |
| *G06F 16/2457* | (2019.01) |
| *G06F 16/535* | (2019.01) |
| *G06T 11/20* | (2006.01) |

(52) U.S. Cl.
CPC ........ *G06F 16/5866* (2019.01); *G06F 16/248* (2019.01); *G06F 16/24578* (2019.01); *G06F 16/51* (2019.01); *G06F 16/535* (2019.01); *G06T 11/20* (2013.01)

(58) Field of Classification Search
CPC ........... G06F 17/30268; G06F 17/3028; G06F 17/3053; G06F 17/30554
USPC ........................................................ 707/724
See application file for complete search history.

(56) References Cited

U.S. PATENT DOCUMENTS

| | | |
|---|---|---|
| 6,977,679 B2 | 12/2005 | Tretter et al. |
| 7,872,593 B1 | 1/2011 | Rauscher et al. |
| | (Continued) | |

OTHER PUBLICATIONS

International Search Report and Written Opininion for International Appln. No. PCT/US2014/034376, dated Aug. 22, 2014.

(Continued)

*Primary Examiner* — Jensen Hu
(74) *Attorney, Agent, or Firm* — Lerner, David, Littenberg, Krumholz & Mentlik, LLP (57) ABSTRACT

In response to a request for images of a location, a set of images depicting different conditions at the location is identified. Each image of the set of images is associated with condition information defining the conditions depicted in that image. A point in time of interest to a user is determined, and information identifying environmental conditions at the location for that point in time may be received. The set of images are ranked based on the received environmental information and the condition information for each image. An image from the set of images is selected for display based on the selected image's rank relative to other images of the set of images. The selected image depicts conditions at the location most closely matching environmental conditions expected at the point in time.

17 Claims, 6 Drawing Sheets

(56) References Cited

U.S. PATENT DOCUMENTS

| | | | |
|---|---|---|---|
| 8,150,617 B2 | 4/2012 | Manber et al. | |
| 8,200,712 B2 | 6/2012 | Koch et al. | |
| 8,275,540 B2 | 9/2012 | Downs et al. | |
| 8,275,649 B2 | 9/2012 | Zheng et al. | |
| 8,391,615 B2 | 3/2013 | Wu et al. | |
| 8,406,992 B2 | 3/2013 | Laumeyer et al. | |
| 8,539,380 B2 | 9/2013 | Krumm et al. | |
| 8,594,702 B2 | 11/2013 | Naaman et al. | |
| 8,694,456 B2 | 4/2014 | Grigg et al. | |
| 8,719,198 B2 | 5/2014 | Zheng et al. | |
| 8,842,197 B2 | 9/2014 | Singh | |
| 8,898,148 B1* | 11/2014 | Yagnik | G06F 17/30867 707/721 |
| 8,995,716 B1* | 3/2015 | Zomet | G06K 9/00664 382/103 |
| 8,996,305 B2 | 3/2015 | Kesar et al. | |
| 9,009,093 B1 | 4/2015 | Omoigui | |
| 9,672,223 B2* | 6/2017 | Rapoport | G06F 17/30265 |
| 9,851,471 B2* | 12/2017 | Praun | H04L 51/20 |
| 2002/0181739 A1 | 12/2002 | Hallowell et al. | |
| 2003/0103086 A1* | 6/2003 | Robinson | H04W 4/02 715/810 |
| 2005/0169499 A1 | 8/2005 | Rodriguez et al. | |
| 2006/0123001 A1* | 6/2006 | Burns | G06F 17/30867 |
| 2006/0224583 A1 | 10/2006 | Fikes et al. | |
| 2007/0043748 A1* | 2/2007 | Bhalotia | G06F 17/30265 |
| 2007/0127833 A1* | 6/2007 | Singh | G06F 17/30265 382/254 |
| 2007/0150188 A1 | 6/2007 | Rosenberg | |
| 2007/0159355 A1* | 7/2007 | Kelly | G01C 21/3694 340/905 |
| 2008/0005068 A1 | 1/2008 | Dumais et al. | |
| 2008/0147730 A1 | 6/2008 | Lee et al. | |
| 2008/0201647 A1 | 8/2008 | Lagerstedt et al. | |
| 2008/0222132 A1 | 9/2008 | Pan et al. | |
| 2009/0012953 A1 | 1/2009 | Chu et al. | |
| 2009/0012955 A1 | 1/2009 | Chu et al. | |
| 2009/0143977 A1 | 6/2009 | Beletski et al. | |
| 2009/0278938 A1 | 11/2009 | Shulman | |
| 2010/0057728 A1 | 3/2010 | Quick et al. | |
| 2010/0131499 A1 | 5/2010 | van Leuken et al. | |
| 2010/0191459 A1* | 7/2010 | Carter | G01C 21/32 701/532 |
| 2010/0217525 A1 | 8/2010 | King et al. | |
| 2010/0250581 A1* | 9/2010 | Chau | G06F 17/30265 707/769 |
| 2010/0287178 A1 | 11/2010 | Lambert et al. | |
| 2010/0295971 A1* | 11/2010 | Zhu | H04N 1/00204 348/240.99 |
| 2010/0305848 A1* | 12/2010 | Stallman | G06F 17/3087 701/465 |
| 2010/0306249 A1 | 12/2010 | Hill et al. | |
| 2011/0302162 A1 | 12/2011 | Xiao et al. | |
| 2012/0013713 A1 | 1/2012 | Sumitomo | |
| 2012/0023103 A1 | 1/2012 | Soderberg et al. | |
| 2012/0054337 A1 | 3/2012 | Moritz et al. | |
| 2012/0062596 A1 | 3/2012 | Bedi et al. | |
| 2012/0081574 A1 | 4/2012 | Kawakami | |
| 2012/0084248 A1* | 4/2012 | Gavrilescu | G06F 17/30867 706/52 |
| 2012/0100869 A1 | 4/2012 | Liang et al. | |
| 2012/0310981 A1 | 12/2012 | Lee et al. | |
| 2012/0316902 A1 | 12/2012 | Kumar et al. | |
| 2013/0013591 A1* | 1/2013 | Hu | G06F 17/30265 707/723 |
| 2013/0024449 A1* | 1/2013 | Chatterji | G06F 17/30864 707/728 |
| 2013/0036139 A1* | 2/2013 | Kung | G06Q 10/025 707/780 |
| 2013/0053054 A1 | 2/2013 | Lovitt et al. | |
| 2013/0091158 A1 | 4/2013 | Kim | |
| 2013/0101159 A1* | 4/2013 | Chao | G06K 9/00771 382/103 |
| 2013/0110822 A1* | 5/2013 | Ikeda | G06F 17/3087 707/722 |
| 2013/0218449 A1 | 8/2013 | Hymel et al. | |
| 2013/0226915 A1* | 8/2013 | Scofield | G06F 17/3087 707/724 |
| 2013/0232168 A1* | 9/2013 | McGregor | G06F 17/30241 707/769 |
| 2013/0325780 A1 | 12/2013 | Prakash et al. | |
| 2013/0346523 A1* | 12/2013 | Praun | H04L 51/20 709/206 |
| 2014/0143351 A1 | 5/2014 | Deng | |
| 2014/0229107 A1 | 8/2014 | Didjusto et al. | |
| 2014/0278591 A1 | 9/2014 | Blecharczyk et al. | |
| 2014/0297575 A1* | 10/2014 | Rapoport | G06F 17/30241 706/46 |
| 2014/0324843 A1* | 10/2014 | Rapoport | G06F 17/30241 707/724 |
| 2015/0168150 A1* | 6/2015 | Kahn | H04W 4/21 701/408 |
| 2015/0302622 A1* | 10/2015 | Takechi | G01W 1/10 345/629 |
| 2015/0310601 A1 | 10/2015 | Rodriguez et al. | |
| 2016/0180235 A1* | 6/2016 | Sabah | G06F 16/285 706/52 |
| 2018/0005434 A1* | 1/2018 | Ren | G06T 17/05 |

OTHER PUBLICATIONS

Patent Examination Report No. 1 for Australian Patent Application No. 2014248420, dated Nov. 11, 2016.
Examination Report for European Patent Application No. 14727996.2, dated Apr. 12, 2017. 7 pages.
Summons to Attend Oral Proceedings for European Patent Application No. 14727996.2 dated Dec. 12, 2017. 9 pages.
Result of Consultation for European Patent Application No. 14727996.2, dated Jun. 28, 2018. 5 pages.

* cited by examiner

SYSTEM AND METHOD FOR PRESENTING CONDITION-SPECIFIC GEOGRAPHIC IMAGERY

CROSS-REFERENCE TO RELATED APPLICATIONS

The present application is a continuation of U.S. patent application Ser. No. 13/870,419, filed Apr. 25, 2013, the disclosure of which is incorporated herein by reference.

BACKGROUND

Various services such as Google Maps may provide street level images, often called "Street Views", of geographic locations to users. Typically in such services, a client computer may request street level images of a particular location and receive images, such as digitized panoramic 360 photographs, taken at street level in response. The images are received from different sources and may be grouped by locations where the images were taken. In some examples, these images may include street level photographs of real world locations, which may allow users to view these locations from a person's perspective at ground level.

User searches for maps and photos using such services for displaying street level images may often return images of a place at the most popular times for taking pictures and under perfect conditions. However, if the users are en route to a place or planning a trip at a certain time, the returned images may not match how the place may currently look upon the user's arrival.

BRIEF SUMMARY

Aspects of this disclosure may be advantageous for providing techniques in searching for images of a location that depict current conditions at that location for a future point in time, such as an expected arrival time of a user. One aspect of the present technology provides a method. The method includes receiving a request for images of a location. In response to the request, a set of images depicting different conditions at the location may be identified. Each image of the set of images is associated with condition information defining the conditions depicted in that image. The method further includes determining when a user will be at the location at a future point in time. Environmental information including information identifying environmental conditions expected at the location for the future point in time may be received. The set of images are ranked based on the received environmental information and the condition information for each image of the set of images. An image from the set of images may be selected for display on a client device based on the selected image's rank relative to other images of the set of images. The selected image depicts current conditions at the location most closely matching the environmental conditions expected at the future point in time.

In one example, the future point in time may be based on at least one of: a search query performed by the user, a current location of the user, and the user's search history. In this regard, if the future point in time is based on the user's search history, the search history includes information indicating items related to a given time period corresponding to the future point in time. Ranking the set of images comprises identifying visual features disposed in each image of the set of images. The visual features disposed in a highest ranked image corresponds to the received environmental information In one example, the environmental condition information includes information representing weather conditions at the location for a time corresponding to the future point in time.

In one example, the environmental condition information further includes information representing a time of day at the location for the future point in time.

In one example, the environmental condition information further includes information related to a seasonal event that occurred at location. The event occurred at a time corresponding to the future point in time.

Another aspects of the present technology provides a non-transitory computer readable medium including instructions that, when executed by a processor, cause the processor to perform a method. The method further includes receiving a request for images of a location. In response to the request, a set of images depicting different conditions at the location may be identified. Each image of the set of images is associated with condition information defining the conditions depicted in that image. The method includes determining when a user will be at the location at a future point in time. Environmental information including information identifying environmental conditions expected at the location for the future point in time may be received. The set of images are ranked based on the received environmental information and the condition information for each image of the set of images. An image from the set of images may be selected for display on a client device based on the selected image's rank relative to other images of the set of images. The selected image depicts current conditions at the location most closely matching the environmental conditions expected at the future point in time.

Yet another aspect of the present technology provides a system that includes a memory for storing images and a processor coupled to the memory. The processor may be configured to receive a request for images of a location. In response to the request, a set of images depicting different conditions at the location may be identified. Each image of the set of images is associated with condition information defining the conditions depicted in that image. The processor may be further configured to determine when a user will be at the location at a future point in time. Environmental information including information identifying environmental conditions expected at the location for the future point in time may be received. The set of images are ranked based on the received environmental information and the condition information for each image of the set of images. An image from the set of images may be selected for display on a client device based on the selected image's rank relative to other images of the set of images. The selected image depicts current conditions at the location most closely matching the environmental conditions expected at the future point in time.

DETAILED DESCRIPTION

Aspects, features and advantages of this disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The present disclosure relates generally to ranking identified images of a location based on current conditions at that location. For example, when a user initiates a request to view images, such as street level images, of a geographic location, the techniques disclosed herein may automatically select real-world street level images that are most visually relevant to the current conditions (e.g., weather, time of day, holiday decor, etc.) at the location expected at a future point in time. While aspects of the disclosure are discussed in connection with street-level imagery, these techniques can also be used with other types of imagery such as aerial imagery or indoor imagery.

According to aspects, in response to a user request, a set of images for a location can be identified where the images correspond to images depicting different conditions at the location. Each image of the set of images is associated with condition information depicted in that image. It may be determined when a user will be at the location at a future point in time. For example, for a user currently traveling to a location, the user's current Global Positioning System (GPS) coordinates may be used to determine the user's expected time of arrival at the location. In order to determine which images of the set of images are displayed to the user, the images are ranked by a processor based on received environment information and the condition information associated with each image. The received environment information may include information indicating current environmental conditions at the location for the future point in time. An image from the set of images may be selected based on its rank relative to other images of the set of images. The selected image may depict current conditions at the location most closely matching the environmental conditions expected at the future point in time.

Figure 1:
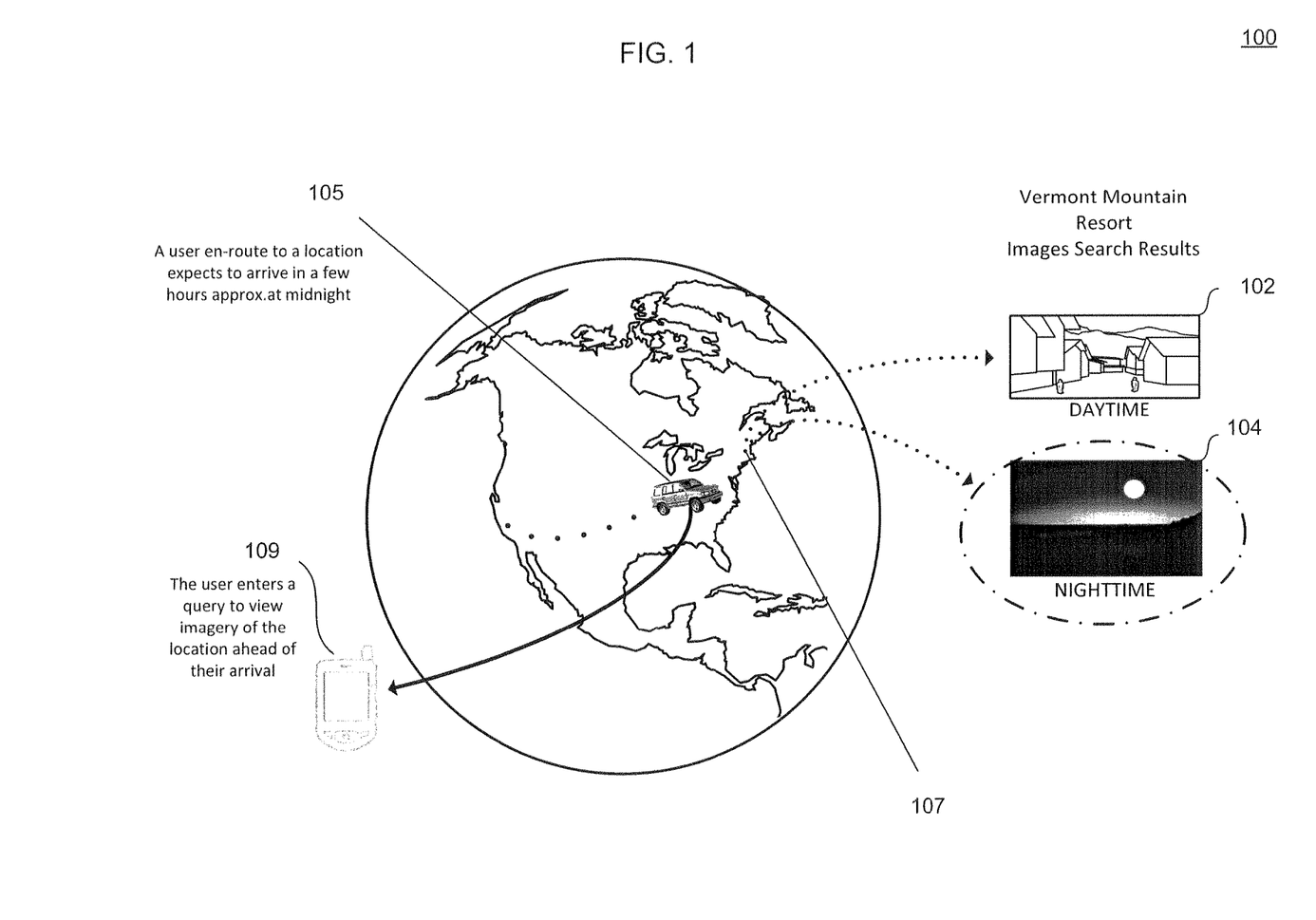
FIG. 1 is an example set of images including street level images in accordance with aspects of the disclosure.

FIG. 1 is an example set of images 100 including a set of street level images 102-104 of a location. The set of images 100 may depict objects at the location such as a street, buildings, various terrains and different environmental conditions. Typically, these images are captured, for example, by cameras or image capturing devices at the locations in a direction generally parallel to the ground.

The set of images 100 may be identified in response to a user's request for imagery of a location. For example, a user may request images of a location the user may plan to visit at a future point in time. The search request or query for images of the location may include relevant information for identifying the location. For example, the user's query may include information indicating a specific location (e.g., "Vermont Mountain Resort"), a longitude/latitude position, a street address or other types identifying information that may be used to determine the location of which the user desires to view street level imagery. In one example, the user may enter the identifying information into a browser on client device 109. Thereupon, a server in communication with the client device 109 may identify one or more images also associated with the identifying information, and send these images to the client device 109.

The client device 109 may receive the image and display them to the user. As an example, a street level image may be shown to a user on a display of the client device 109 along with controls for zooming in on the image as well as controls for changing the orientation of the view (which may require retrieving more street level images). For example, the techniques disclosed herein may be implemented in connection with an Internet browser such as Google Chrome (not shown) for displaying street level images as well as other information. Other navigation controls may be included as well, such as panning controls in the form of arrows disposed along the street. Such arrows may be selected by a user (by clicking or by dragging along the street line) to change the vantage point from up to down the street.

Although more than one image may be identified for a location, a particular user may be most interested in viewing an image that depicts conditions at the location for a time closely matching an expected time of arrival. For example, the user may be en route to a location 107 when making a request for imagery of that location. As shown in the example of FIG. 1, the set of images 100 identified in response to the user's request may include images, such as street level images 102 and 104 that may depict the location 107 under different conditions (e.g., at daytime and nighttime).

The user's expected time of arrival at a location can be estimated, for example, based on the user's current geolocated position. For example, the user's client device 109 may include a positioning component, such as a GPS receiver, to determine a location of the device. Based on the device's current position, it can be approximated how far the user may be from the desired location. In turn, an arrival time of the user at the location can be estimated based on the user's known position and the user's given rate of travel. In some aspects, the rate of travel of the user may be interpolated, for example, from the GPS signal.

This particular user, however, may be traveling by vehicle 105 to the location 107 and may arrive at a certain time of day, such as 12:00 am midnight. In this case, a nighttime image 104 of location 107 may be selected to display to the user in a browser because it most closely matches the time of day (e.g., current environmental conditions) expected at the time the user will arrive in the future. The time of day at a location may be determined, for example, by using a latitude/longitude coordinate of the requested location to determine a time zone at that location. The time zone, in turn, may then be used along with an internal clock of the client device 109 to calculate an expected local arrival time of the user at the location.

Other types of current conditions may also be used to select and provide images. For example, weather and other types of conditions for a location can be determined based on available information, such as current weather conditions, weather forecasts as well as historical information about the location. This information may then be used as described above to select images.

Figure 2:
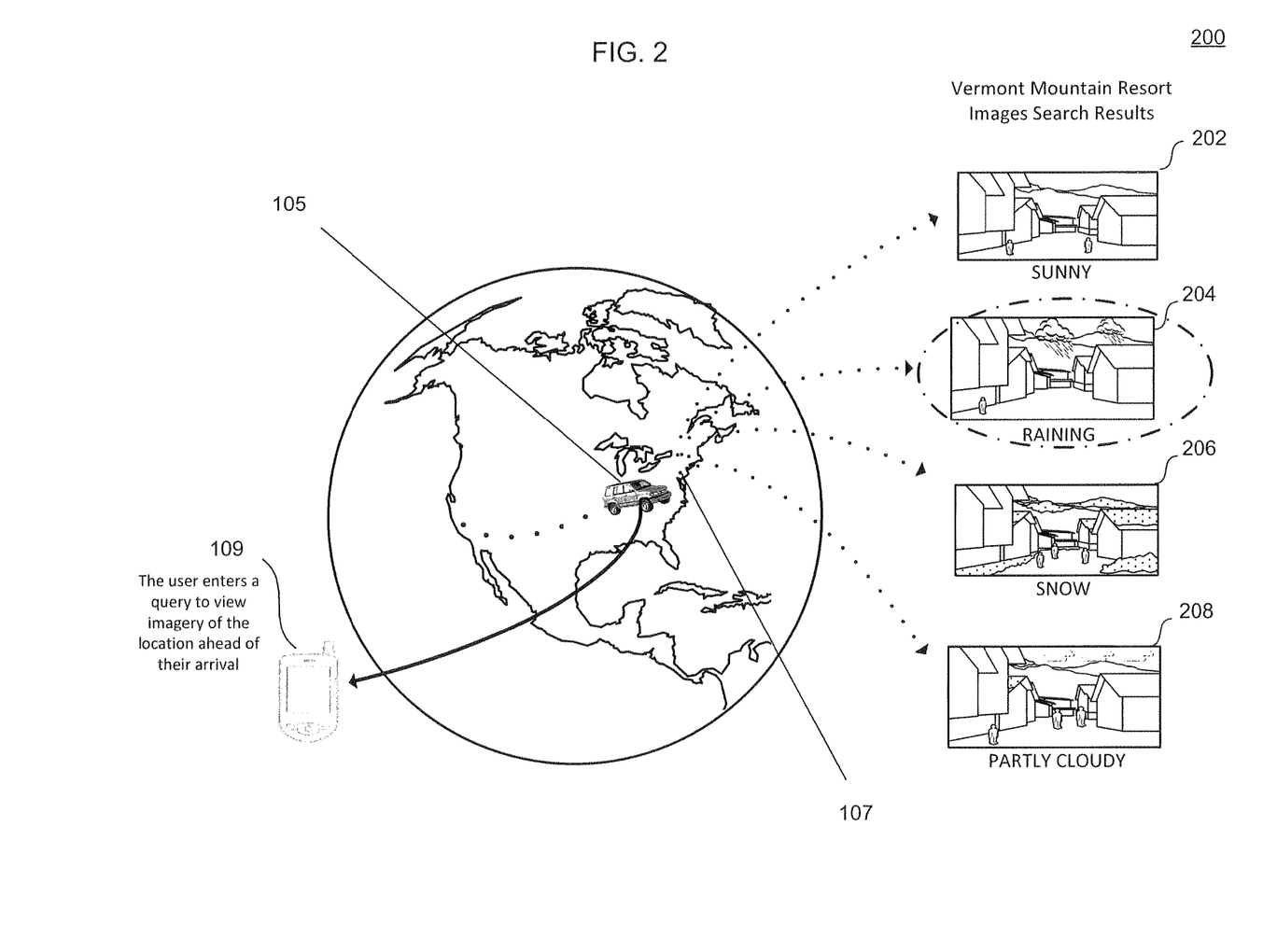
FIG. 2 is another example set of images including street level in accordance with aspects of the disclosure.

FIG. 2 is an example of such conditions. In this example, a set of images 200 includes street level images 202-208 depicting different weather conditions at a location (e.g., raining, sunny, snow, partly cloudy). As an example, a possible source of information regarding current weather conditions at a location may be a weather service that may provide current weather conditions as well as a prediction of the weather at that location over a range of time. For example, in response to receiving a location identifier, such as a desired destination of the user traveling via vehicle 105, the weather service may provide information about weather conditions at the desired destination.

In this instance, the image closely matching the weather conditions expected at the time of arrival of user may be displayed on client device 109 in response to the user's request for images of location 107. For example, if the weather service provides information indicating that it may be raining at the user's desired destination, image 204 which depicts the location in the rain may be selected for display to the user.

Still further, other information regarding conditions at a location may include a current time of day, holiday events or seasonal conditions expected when the user will arrive. In this regard, there are many indicators that can be used to estimate when a user will be at a location. For example, the user's search query may include signals indicating which seasonal conditions reflect the current conditions expected at the location when the user arrives, this may include information indicating a specific time period the user plans to be at the location.

Figure 3:
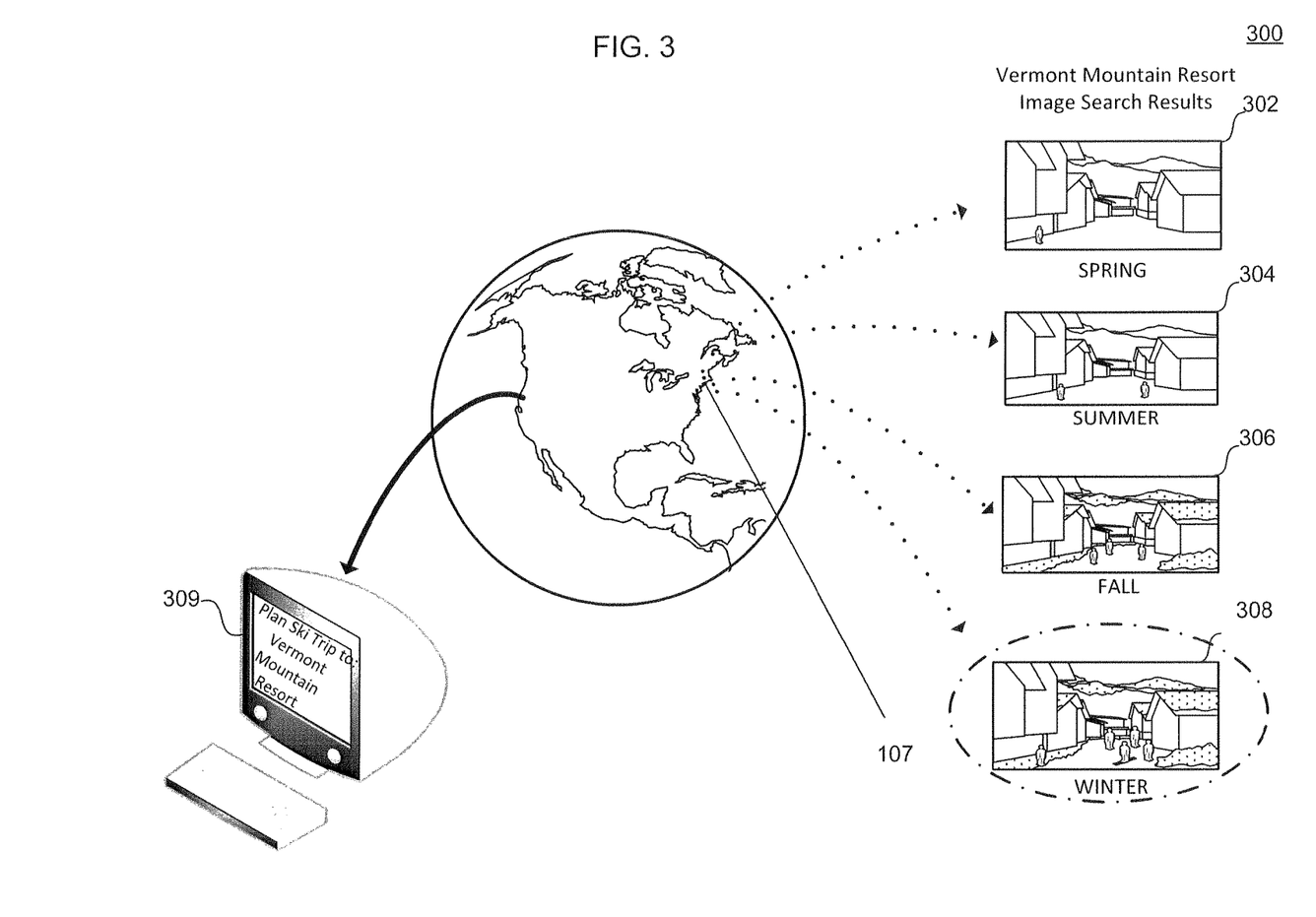
FIG. 3 is yet another example set of images including street level images in accordance with aspects of the disclosure.

As shown in the example of FIG. 3, a set of images 300 may include street level images 302-308 that depict a location 107 under different seasonal conditions, such as spring, summer, fall and winter. For example, a user planning a trip to the location 107 at some future point in time may wish to view images of that location beforehand. In this example, the query may indicate the user's plans for an upcoming ski trip by including information for "Vermont Ski Resort", etc., indicating that the user desires to view imagery of the location that corresponds to winter conditions for the location.

In some aspects, a user's navigation history may also include signals indicating a specific time period the user plans to be at the location. For example, the user's navigation history may indicate that the user has viewed airline or hotel bookings for the location for a specific date or recently purchased items for the trip that are typically used during certain months like skies or ski boots. The user may have searched for driving direction to the location, e-mailed a friend or performed a number of other browsing activities which can be used as an indicator to determine a specific time period related to user's expected arrival at a location.

For situations in which the subject matter described herein collects information about users, or may make use of user-related information, the users may be provided with an opportunity to control whether programs or features collect user information (e.g., information about a user's social network, social actions or activities, profession, preferences or a user's current location), or to control whether and/or how to receive information that may be of interest to the user. In addition, certain data may be treated in one or more ways before it is stored or used, so that personally identifiable information is removed. For example, a user's identity may be treated so that no personally identifiable information can be determined for the user, or a user's current and historical location may be generalized where location information is obtained (such as to a city, ZIP code or state level), so that a particular location of a user cannot be determined. A user may also be provided with the opportunity to decide whether, and to control how such information (such as search and location history) is used and stored on a user's device and by servers with which the device communicates.

Figure 4:
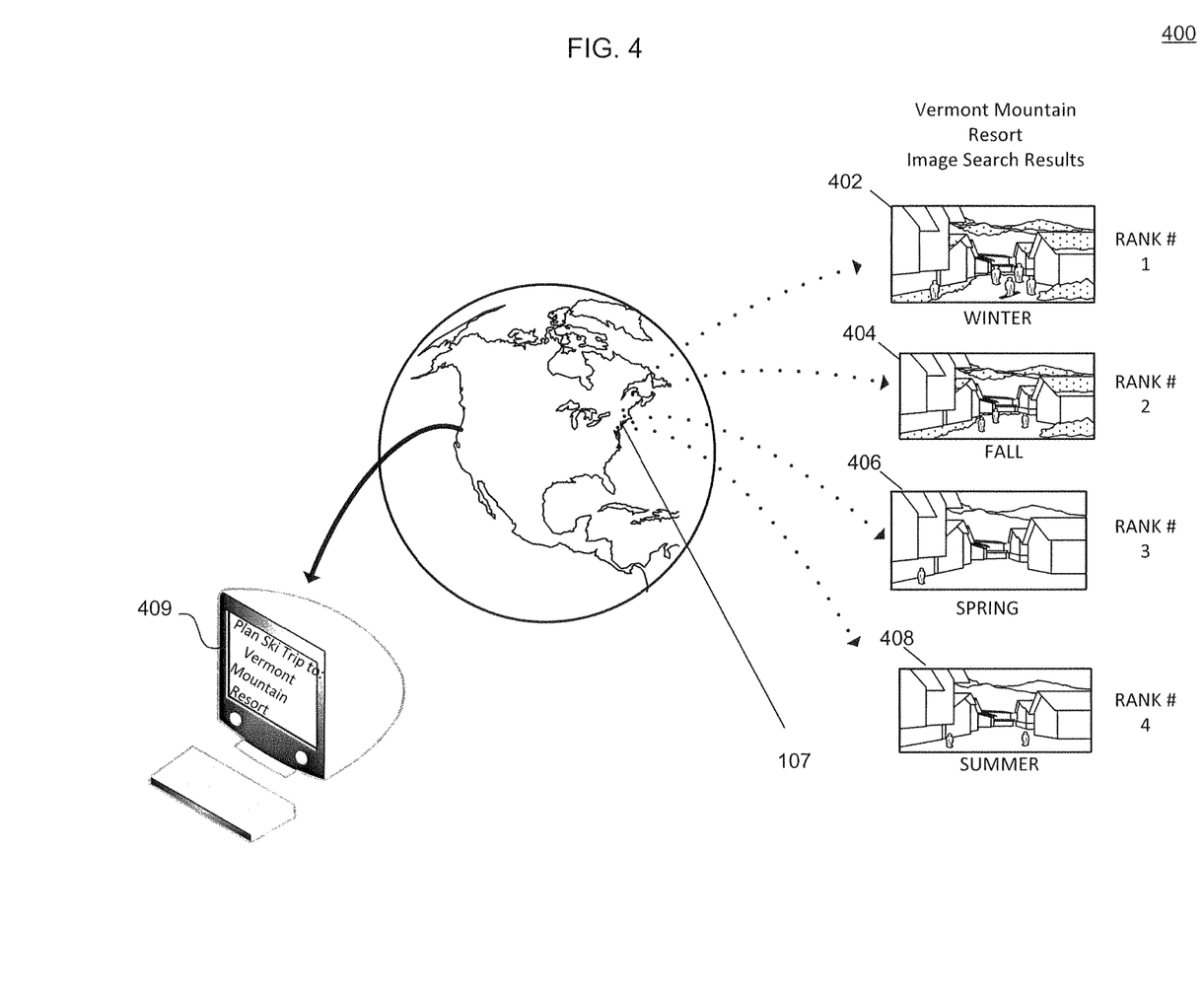
FIG. 4 is an example of a ranked set of images in accordance with aspects of the disclosure.

Before selecting an image to be displayed to the user, images identified based on the conditions as described above may be ranked. FIG. 4 is an example of a ranked set of images 400 including street level images 402-408. As noted above, the set of images 402-408 may be identified in response to the user request for images of a location 107. The images may be ranked for display to a user on client device 409 based on how closely they match the current conditions. For example, conditions depicted in a highest ranking image may correspond to the current conditions expected at the location.

As shown in the example of FIG. 4, the image depicting location 107 during winter months ranks higher than other images 404, 406 and 408 identified for that location. In this example, the winter image 402 may depict conditions that are more aligned with the user's planned ski trip to the location during the winter or simply at the time of day or the current weather conditions at the user's time of arrival.

In order to determine a ranking of the identified set of images, a number of indicators may be used to determine current conditions depicted in the images. In one aspect, a date and time may be associated with the images indicate a time of day depicted in the images, such as the time of day when the image was captured. In some aspects, image analysis may be performed on the set of images to extract features that may be used to identify various ambient lighting or weather conditions depicted in the images. For example, a mostly dark image may depict a night scene of a location as opposed to depicting a day scene. In other examples, certain objects in an image may be identified as being snow covered identifying the images as winter month images versus objects depicted on a bright sunny summer day.

The current conditions depicted in the images may also be identified base on information stored in the image (e.g., metadata). For example, the information associated with an image may indicate that a certain white balance was used on a camera when capturing the image. This may indicate that the picture was taken at a location at night and, thus represent a nighttime depiction of the location. Other metadata may include specific camera settings used to capture the image that may indicate the environment conditions depicted in the image, such as a camera setting for cloudy or daytime mode.

In other situations, a user may tag or otherwise label the images with information identifying seasonal events and celebrations, or other meaningful condition information depicted in the images. For example, the images may be labeled based on identified Christmas lights and other related decorations on structures within the image indicating that the images are related to a specific holiday event and/or time frame.

Figure 5:
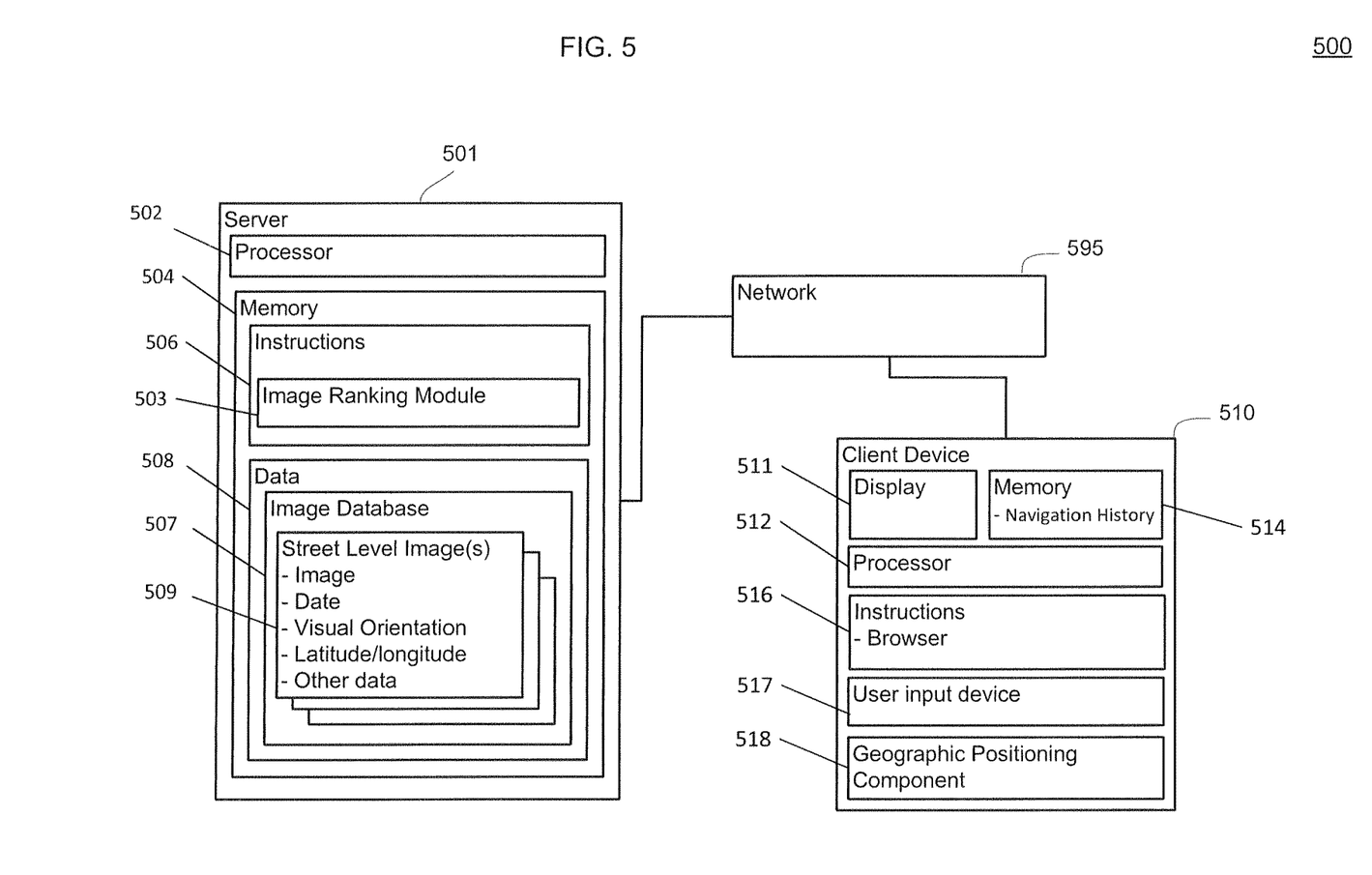
FIG. 5 is a block diagram of a system in accordance with aspects of the disclosure.

FIG. 5 is a block diagram of an example system 500, which includes a server 501 coupled to a network 595 and one or more client devices (only client device 510 being shown in FIG. 5 for clarity) capable of communicating with the server 501 over the network 595. The server 501 may include a processor 502, memory 504, and other components typically present in general purpose computers.

The memory 504 of server 501 may store information accessible by the processor 502, including instructions 506 that may be executed by the processor 502, and data 508. The memory 504 may be of a type of memory operative to store information accessible by the processor 502, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions and data are stored on different types of media.

Although FIG. 5 functionally illustrates the processor 502 and memory 504 as being within the same block, the processor 502 and memory 504 may actually include multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 502. Similarly, the processor 504 may actually comprise a collection of processors, which may or may not operate in parallel.

Data 508 may be retrieved, stored or modified by processor 502 in accordance with the instructions 506. For instance, although the systems and method disclosed herein are not limited by a particular data structure, the data 508 may be stored in computer registers, in a relational database as a table having a plurality of different fields and records, XML documents, or flat files. The data 508 may also be formatted in a computer-readable format such as, but not limited to, binary values, ASCII or Unicode. By further way of example only, the data 508 may be stored as bitmaps comprised of pixels that are stored in compressed or uncompressed, or various image formats (e.g., JPEG), vector-based formats (e.g., SVG) or computer instructions for drawing graphics. Moreover, the data 508 may comprise information sufficient to identify the relevant information, such as numbers, descriptive text, proprietary codes, pointers, references to data stored in other memories (including other network locations) or information used by a function to calculate the relevant data.

A typical system can include a large number of connected computers, with each different computer being at a different node of the network 595. The network 595, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by a device capable of transmitting data to and from other computers, such as modems (e.g., dial-up, cable or fiber optic) and wireless interfaces.

The client device 510, such as client device 109 of FIGS. 1-2 and client device 309 of FIGS. 3-4, may be configured similarly to the server 501, with a processor 512, memory 514, instructions 516, and all of the internal components normally found in a personal computer. By way of example only, the client device 510 may include a central processing unit (CPU), display device 511 (for example, a monitor having a screen, a projector, a touch-screen, a small LCD screen, a television, or another device such as an electrical device operable to display information processed by the processor 512), CD-ROM, hard-drive, user input device 517 (for example, a keyboard, mouse, touch-screen or microphone), speakers, modem and/or network interface device (telephone, cable or otherwise) and all of the components used for connecting these elements to one another.

The client device 510 may be a computing device. For example, client device 510 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 510, the client device 510 may be implemented as multiple devices with both portable and non-portable components (e.g., software executing on a rack-mounted server with an interface for gathering location information).

Although the client devices 510 may include a full-sized personal computer, the subject matter of the present disclosure may also be used in connection with mobile devices capable of wirelessly exchanging data. For example, client device 510 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise a device capable of processing instructions and transmitting data to and from humans and other devices and computers including general purpose computers, network computers lacking local storage capability, game consoles, and set-top boxes for televisions.

The client device 510 may include a component, such as circuits, to determine the location of the device. For example, the client device 510 may include a GPS positioning component or receiver 518. By way of example only, the positioning component 518 may include software for determining the position of the device based on other signals received at the client device 510, such as signals received at a cell phone's antenna from one or more cell phone towers if the mobile device is a cell phone. In that regard, the provision of location identification data may occur automatically based on information received from such a component.

The instructions 516 of the client device 610 may be a set of instructions to be executed directly (such as machine code) or indirectly (such as scripts) by the processor. In that regard, the terms "instructions," "steps" and "programs" may be used interchangeably herein. The instructions 516 may be stored in object code format for direct processing by the processor, or in other computer languages including scripts or collections of independent source code modules that are interpreted on demand or compiled in advance. Functions, methods and routines of the instructions are explained in more detail below.

The instructions 516 may include a browser for displaying network content, and a navigation history of a user of the client device 510. The browser provides for the display of network content, such as street level images, a set of search results or other types of network content, to a user of the client device 510 by sending and receiving data across the network 595. The network content may be received in response to a search query that includes a search text including an indication of a location. The search results returned are associated with locations within the geographic region. For example, the search results can be a number of street level images of different buildings or landscapes within the geographic region.

Memory 514 may store a user's navigation history. The user's navigation history may represent data collected by using one or more browser add-ons, scripts or toolbars. In some aspects, the navigation history may be maintained on a remote server, such as server 501 and provided to the client device 510. As discussed above, users may be provided with an opportunity to control whether programs or features of the subject matter disclosed herein may collect user information or to control whether and/or control whether and/or how to receive information that may be of interest to the user. Certain data may also be treated in one or more ways before it is stored or used, so that no personally identifiable information can be determined for the user.

Image database 507 of sever 501 may store image data representing street level images 509, which may be transmitted to client device 510. Each street level image may be stored as image data, which includes an image, date, a visual orientation of the image and other data related to the images like an exposure setting used on a device to capture the images. The street level images 509 may include images of objects at locations, such as buildings, streets, and terrains. The street level images may be captured by cameras at the locations from a perspective a few feet above the ground. In many aspects, a typical street level image may include as many geographic objects (street lights, mountains, trees, bodies of water, vehicles, people, etc.) in as much detail as a camera can possibly capture.

The image database 507 can include information relevant to a location of the street level images 509. For example, the street level images 509 may include or be associated with latitude/longitude coordinates representing locations where the images were captured. Although the subject matter disclosed herein is not limited to a particular positional reference system, latitude/longitude positions may be used when referencing locations of the street level images 509 of system 500.

System 500 may further include a source that provides information about the current conditions at locations depicted in the street level images 509. The source may be stored at the server 501 or may include external sources such as websites. As noted above, one possible external source of information is weather service. For example, in response to receiving a location over network 595, the weather service may provide information about current and forecast weather at the location.

In one aspect, system 500 may perform a search query for street level images 509 in response to a user request. For example, the user may enter a search query for street level images using the client device 510. In response to the search query, a set of street level images 509 associated with a location may be returned. The user may view these street level images 509, for example, on the display 511 of client device 510. Although the images retuned by the server 501 may accurately depict the location, the user's interest may be directed towards viewing images of the location that depict current environmental conditions at a specific period of time, such as a time the user will at the location.

The search request may include signals indicating which images are relevant to the user's interest. For example, a user request for "Vermont ski resorts" may indicate that the user does not just want images of these resorts, but specific imagery depicting the location during the winter months. Other types of signals indicating a user's interest in specific imagery of a location may include information about the user such as their current distance from a location or their navigation history. For example, if a user's navigation history discloses that the user has been searching for cold weather type items like ski boots; this may indicate that the user wants specific imagery of the location depicted in winter months. System 500 can be configured to rank the selected images that are most visually relevant to the user's interest.

In order to facilitate the image ranking operations of system 500, the instructions 506 of server 501 may further include an image ranking module 503. The image ranking module 503 may be operable in conjunction with the server 210 from where it may receive the above described signals indicating which images are visual relevant to a user's interest. The functionally of this module can exist in a fewer or greater number of modules than shown in FIG. 5, with such modules residing at one or more computing devices, which may be geographically dispersed.

The image ranking module 503 may perform image analysis on the set of street level images 509 in order to determine a priority order for displaying the images to a user. For example, the image analysis may identify various lighting or weather conditions depicted in the street level images 509. In this respect, a highest ranking image may reflect the current conditions expected at the location at the specific time period, such as a time the user will arrive at the location.

In some aspects, the image ranking module 503 may classify the conditions depicted in the images based on information stored with the image or identified by a user or system administrator. For example, system 500 may send the images to a system administrator that may prompt the users to manually input a label identifying the environmental conditions depicted in the images before they are stored the image database 507. When selecting images to display to a user, the system 500 may select an image from the set of images where the identified environmental conditions depicted in the image correspond to the current environmental information received regarding the location.

Figure 6:
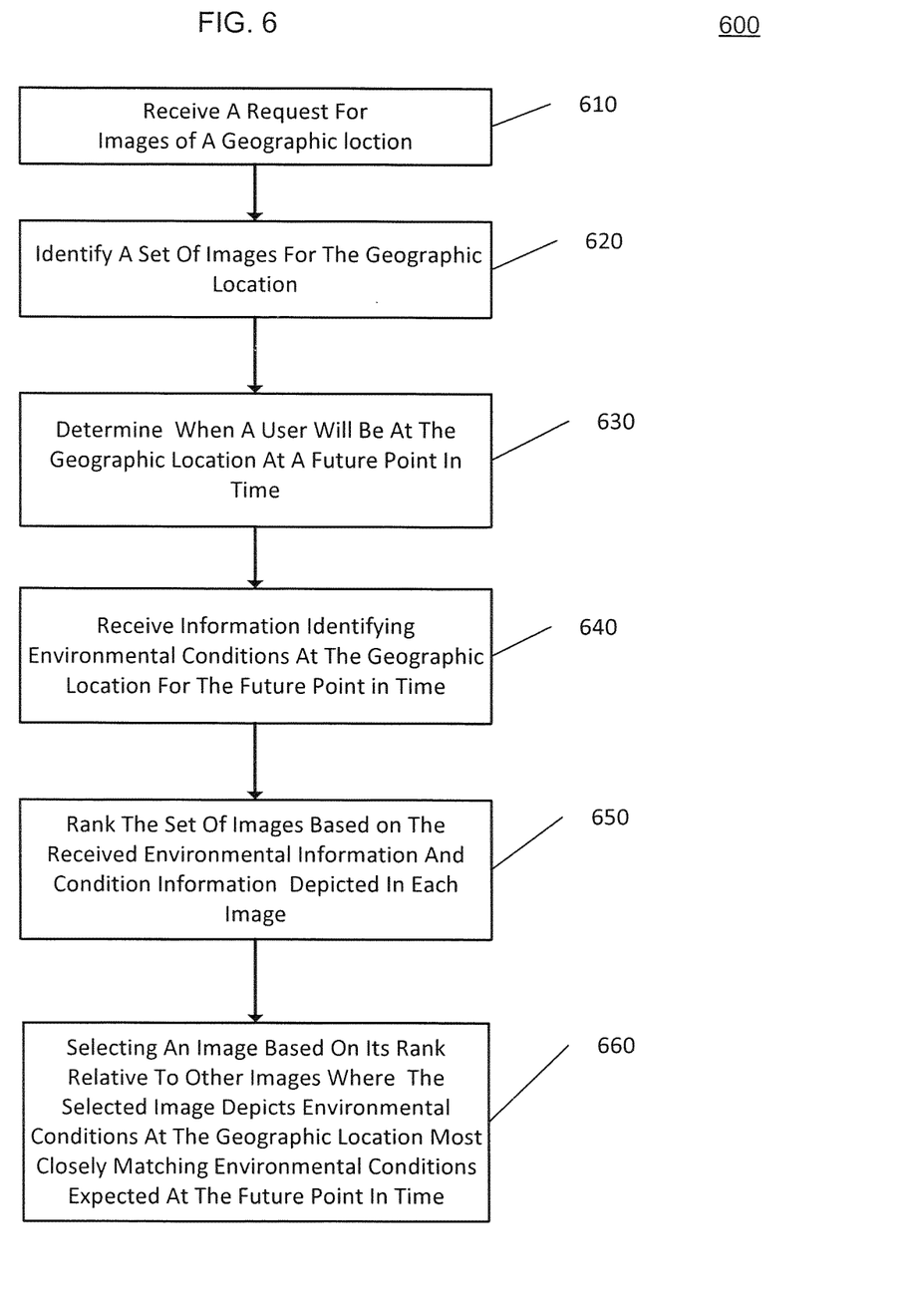
FIG. 6 is a flow diagram depicting an example of a method in accordance with aspects of the disclosure.

FIG. 6 is a flow diagram 600 depicting an example of some of the aspects described above. At stage 610, a request for images of a location may be received. For example, a server may receive a request for real-world street level imagery of a location from a client device, such as client device 510 of FIG. 5. The user may enter a search query using, for example, a browser on a display of the client device. The user's query may include information indicating real-world coordinates of the location, such as a longitude/latitude position, a street address or other types identifying information that may be used to determine the location of which the user desires to view street level imagery.

At stage 620, in response to the user's request, a set of images associated with the location may be identified. For example, these images may depict different environmental conditions at of the location. The different environmental conditions associated with each image may be represented as condition information that may be identified, for example, within in the image itself, as metadata with each image or as a user defined label/tag. The images are stored in a database coupled to a server and are captured at the location over a span of time.

At stage 630, it may be determined when a user will be at the location at a future point in time, such as the user's time of arrival at the location. For example, a number of indicators can be used to determine when a user will be at the location. One such indicator for a user traveling to the location may include the user's current GPS location. For example, from this GPS information, the user's expected time of arrival at the location can be interpolated given the user rate of travel.

Other such indicators may include a search query or the user's Internet browsing history. For example, a user's search query may include information indicating a specific time period the user plans to be at the location, such as an indicator of the user's plans for an upcoming ski trip. The user's Internet browsing history may also indicate certain items purchased (e.g., ski lift tickets), travel bookings or communications related to a specific date or time period the user plans to be at the location.

At stage 640, information identifying environmental conditions at the location may be received. The environmental conditions are related to conditions at the location for the future point in time, which may be a time the user arrives at the location. For example, the identified environmental conditions may include current environmental conditions, such as weather conditions at a location as well as a forecast prediction of weather at that location over a range of time. Other identified environmental conditions may include information regarding seasonal holiday events that occur at the location or a current time of day. This information may be received from various sources in response to those sources receiving a location identifier, such as the identified location from stage 610.

At stage 650, the set of images may be ranked based on the received environmental information and the future point in time. The ranking may identify one or more images that depict different environmental conditions at the location. The ranking may be based on how closely the images match the current environmental condition expected at the future point in time, such as a time of arrival of a user at the location, identified at stage 630.

In order to determine a ranking order for the identified images, a number of indicators are used to determine conditions depicted in the images. For example, a date and time may be associated with the images indicate a time of day depicted in the images. In some aspects, image analysis may be performed on the set of images to extract features that may be used to identify various ambient lighting or weather conditions depicted in the images. For example, using the image analysis, image feature can be identified in the images related to certain environmental climate conditions (e.g., snow on an object). The environmental conditions depicted in the images may also be determined base on information stored with the image or by a user.

At stage 660, an image may be selected based on its rank relative to other images. For example, a highest ranked image may be selected, which depicts current environmental conditions at the location most closely matching the current environmental conditions received at stage 640. The selected image may be displayed to a user on a client device, such as on client device 510 of FIG. 5.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method, comprising:
   receiving, using one or more processors, a request for images of a remote geographical location;
   in response to the request, identifying, using the one or more processors, a set of images depicting different conditions at the remote geographical location;
   inferring, using the one or more processors, a future point in time of interest to a user based on at least one of a search query or a browser search history;
   determining, using the one or more processors, environmental conditions expected at the remote geographical location for the future point in time;
   performing, using the one or more processors, image analysis of the set of images to identify visual features disposed in each image of the set of images, the visual features corresponding to the conditions depicted in each image of the set of images;
   comparing, using the one or more processors, the identified visual features disposed in each image of the set of images with the environmental conditions expected at the remote geographical location for the future point in time;
   ranking, using the one or more processors, the set of images based on the comparison of the identified visual features disposed in each image of the set of images with the environmental conditions expected at the remote geographical location for the future point in time; and
   selecting, for display on a client device, an image from the set of images based on the selected image's rank relative to other images of the set of images, the selected image depicting conditions at the remote geographical location most closely matching the environmental conditions expected at the remote geographical location for the future point in time.

2. The method of claim 1, wherein the future point in time is based on the user's search history, the search history including information indicating items related to a given time period corresponding to the future point in time.

3. The method of claim 1, wherein the environmental conditions include weather conditions at the remote geographical location for a time corresponding to the future point in time.

4. The method of claim 1, wherein the environmental conditions further include conditions representing a time of day at the remote geographical location for the future point in time.

5. The method of claim 1, wherein the environmental conditions further include conditions related to a holiday event that occurred at the remote geographical location, the event occurred at a time corresponding to the future point in time.

6. A non-transitory computer readable medium comprising instructions that, when executed by one or more processors, cause the one or more processors to perform a method, the method comprising:
   receiving, using the one or more processors, a request for images of a remote geographical location;
   in response to the request, identifying, using the one or more processors, a set of images depicting different conditions at the remote geographical location;
   inferring, using the one or more processors, a future point in time of interest to a user based on at least one of a search query or a browser search history;
   determining, using the one or more processors, environmental conditions expected at the remote geographical location for the future point in time;
   performing, using the one or more processors, image analysis of the set of images to identify visual features disposed in each image of the set of images, the visual features corresponding to the conditions depicted in each image of the set of images;
   comparing, using the one or more processors, the identified visual features disposed in each image of the set of images with the environmental conditions expected at the remote geographical location for the future point in time;

ranking, using the one or more processors, the set of images based on the comparison of the identified visual features disposed in each image of the set of images with the environmental conditions expected at the remote geographical location for the future point in time; and selecting, for display on a client device, an image from the set of images based on the selected image's rank relative to other images of the set of images, the selected image depicting conditions at the remote geographical location most closely matching the environmental conditions expected at the remote geographical location for the future point in time.

7. The non-transitory computer readable medium of claim 6, wherein the future point in time is based on the user's search history, the search history including information indicating items related to a given time period corresponding to the future point in time.

8. The non-transitory computer readable medium of claim 6, wherein the environmental conditions include weather conditions at the remote geographical location for a time corresponding to the future point in time.

9. The non-transitory computer readable medium of claim 6, wherein the environmental conditions include conditions representing a time of day at the remote geographical location for the future point in time.

10. A system, comprising:
a memory for storing images; and
one or more processors coupled to the memory, the one or more processors being configured to:
receive a request for images of a remote geographical location;
in response to the request, identify a set of images depicting different conditions at the remote geographical location;
infer when a user will be at the location at a future point in time based on at least one of a search query or a browser search history;
determine environmental conditions expected at the remote geographical location for the future point in time;
perform image analysis of the set of images to identify visual features disposed in each image of the set of images, the visual features corresponding to the conditions depicted in each image of the set of images;
compare the identified visual features disposed in each image of the set of images with the environmental conditions expected at the remote geographical location for the future point in time;
rank the set of images based on the comparison of the identified visual features disposed in each image of the set of images with the environmental conditions expected at the remote geographical location for the future point in time; and
select, for display on a client device, an image from the set of images based on the selected image's rank relative to other images of the set of images, the selected image depicting conditions at the remote geographical location most closely matching the environmental conditions expected at the remote geographical location for the future point in time.

11. The system of claim 10, wherein the future point in time is based on the user's search history, the search history including information indicating items related to a given time period corresponding to the future point in time.

12. The system of claim 10, wherein the environmental conditions include weather conditions at the remote geographical location for a time corresponding to the future point in time.

13. The system of claim 10, wherein the environmental conditions further include conditions representing a time of day at the remote geographical location for the future point in time.

14. The system of claim 10, wherein the environmental conditions further include conditions related to a holiday event that occurred at the remote geographical location, the event occurred at a time corresponding to the future point in time.

15. The non-transitory computer readable medium of claim 6, wherein the environmental conditions further include conditions related to a holiday event that occurred at the remote geographical location, the event occurred at a time corresponding to the future point in time.

16. The method of claim 1, wherein the environmental conditions expected at the remote geographical location for the future point in time are further determined based on a weather forecast received from a weather station.

17. The system of claim 10, wherein the environmental conditions expected at the remote geographical location for the future point in time are further determined based on a weather forecast received from a weather station.

* * * * *